United States Patent [19]

Maiman

[11] 4,213,146

[45] Jul. 15, 1980

[54] SCANNING SYSTEM FOR LIGHT BEAM DISPLAYS

[75] Inventor: Theodore H. Maiman, Marina del Rey, Calif.

[73] Assignee: Laser Video, Inc., Los Angeles, Calif.

[21] Appl. No.: 889,724

[22] Filed: Mar. 24, 1978

Related U.S. Application Data

[62] Division of Ser. No. 484,551, Jul. 1, 1974, Pat. No. 4,084,182.

[51] Int. Cl.² .................. H04N 9/14; H04N 5/74; H04N 3/08; G02B 27/17
[52] U.S. Cl. .................. 358/63; 358/208; 358/232; 350/6.6; 350/6.91; 350/285
[58] Field of Search .............. 358/6, 53, 63, 61, 206, 358/208, 293, 231, 232, 233; 250/235; 350/6.6, 6.91, 285; 346/109

[56] References Cited

U.S. PATENT DOCUMENTS 3,614,312  10/1971  Fournier et al. .................. 358/208

OTHER PUBLICATIONS

Lotspeich, "Electrooptic Light-Beam Deflection", *IEEE Spectrum*, Feb. 1968, pp. 45-52.
Baker, "Laser Display Technology," *IEEE Spectrum*, Dec. 1968, pp. 39-50.

*Primary Examiner*—John C. Martin
*Attorney, Agent, or Firm*—Fraser and Bogucki

[57] ABSTRACT

In a light beam scanning system in which an electromechanical scanner is utilized to provide horizontal scan of an intensity modulated beam, alternate horizontal lines are reversed in the time domain, so that both forward and return motions of the scanning mechanism can be used in the display. The line reversal can be effected by a scan converter mechanism, and nonlinearities in the scanning mechanism can be compensated for by reading out signals during the linear part of the motion or varying the time rate at which the signals are read out.

7 Claims, 9 Drawing Figures

SCANNING SYSTEM FOR LIGHT BEAM DISPLAYS

RELATED APPLICATION

This is a division of application Ser. No. 484,551, filed July 1, 1974, now U.S. Pat. No. 4,084,182.

BACKGROUND OF THE INVENTION

1. Field of the Invention

This invention relates to systems for modulating and scanning multi-chrominant light beams, particularly laser beams, using a reversing scanning mechanism to provide successive line scans of color-modulated information.

2. Description of the Prior Art

In a system in which a modulated light beam is to be displayed in raster fashion, such as in a conventional TV display, it is known to use a galvanometer driven or other reciprocating type of reflective scanning mechanism to provide successive horizontal line scans. The horizontal line frequency in accordance with presently existing television standards is 15,750 cycles per second, which can be satisfied, for individual line scans, by a galvanometer, torsion drive or other high speed type of drive. However, the return time between successive lines in the television standard is based upon the flyback time of an electron beam, and is far less than the time required for a reciprocating mechanism to return from the end of its forward scan motion to the start of the next scan. Thus many workers in the art have proposed the use of, or have actually employed, other scanning mechanisms such as multi-sided prisms or acousto-optic scanners. These, however, are substantially more complex and costly than the reciprocating mirror type of system, and also may introduce unwanted light losses into the transmitted beam. It has therefore been suggested, in U.S. Pat. No. 3,614,312 to Fournier et al, Oct. 19, 1971, that a pair of oppositely oscillating mirrors can be utilized, and that a light switch can be utilized to deflect the beam alternately to the mirrors, so that each horizontal scan line is scanned by a different mirror, with the beams then being recombined into the desired optical path. This substantially complicates the optical path, however, and in fact more than two oscillating scanners may have to be used, as disclosed by Fournier et al. In addition, nonlinearities in the mirror motion must inherently be accepted by the system.

SUMMARY OF THE INVENTION

In accordance with the invention, a single modulator system for a laser beam having multiple color components is utilized to provide improved display efficiency through combination with processing circuits and scanning elements. The horizontal lines of a video signal are stored and alternately inverted prior to laser beam modulation with horizontal beam scanning being effected during successive forward and reverse movements of a simple high speed vibrating mirror drive mechanism such as a galvanometer, or a torsion drive. Nonlinearities in scanning motion may be compensated electronically or optically.

DETAILED DESCRIPTION OF THE INVENTION

Figures 1, 3:
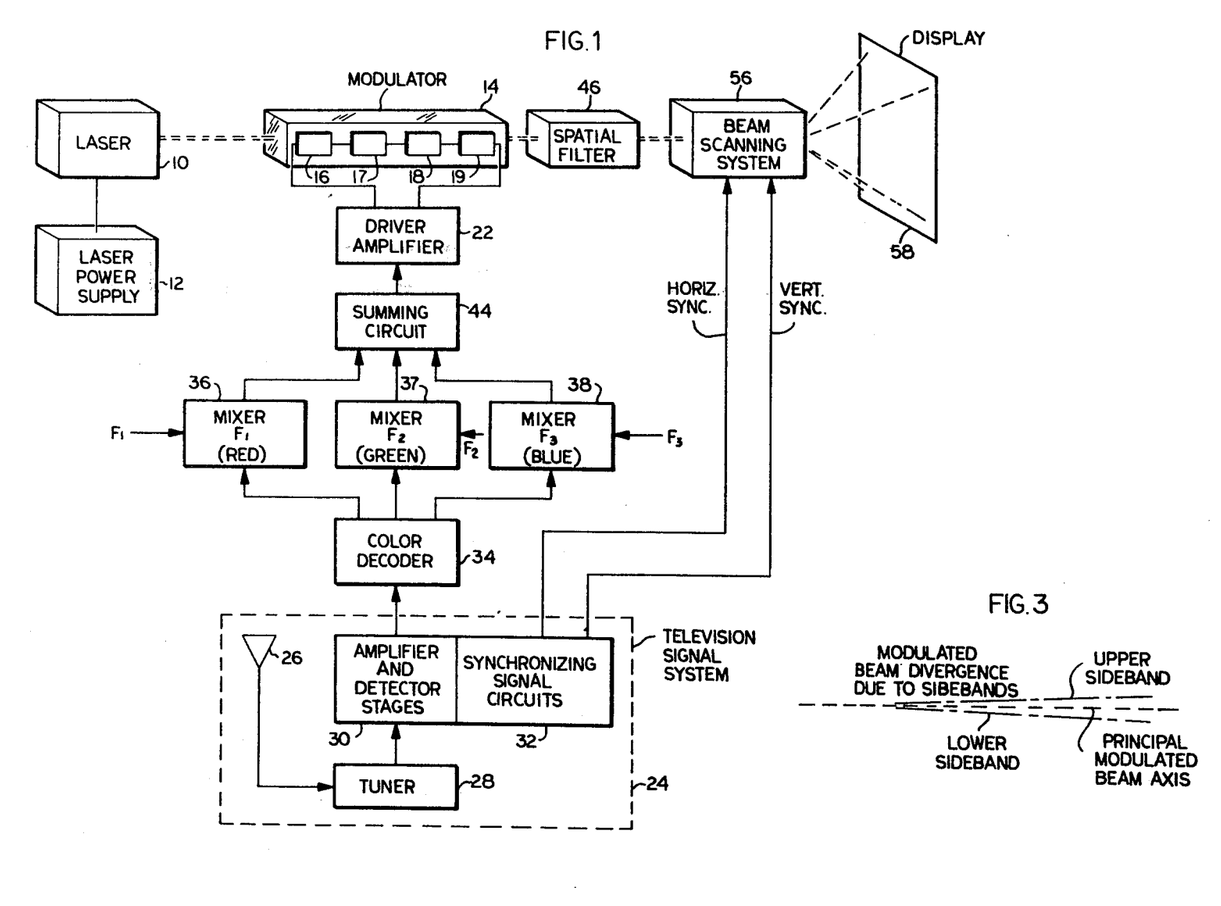
FIG. 1 is a combined perspective and block diagram view of a system in accordance with the invention.
FIG. 3 is a graphic representation of beam divergence in the modulated beam arising from sideband effects.

A system is shown in FIG. 1 for producing a single multi-wavelength modulated beam of laser-generated light for use in color television and other video displays, thermograms, communications or other applications utilizing information-bearing light. Because of the utility of the large scale video display, and because this is perhaps the most difficult context in which systems and methods in accordance with the invention may be utilized, the examples will be concerned primarily with this context. However, it will be appreciated that the modulated information can contain digital and various forms of analog data, as well as video information.

Figures 2, 4, 9:
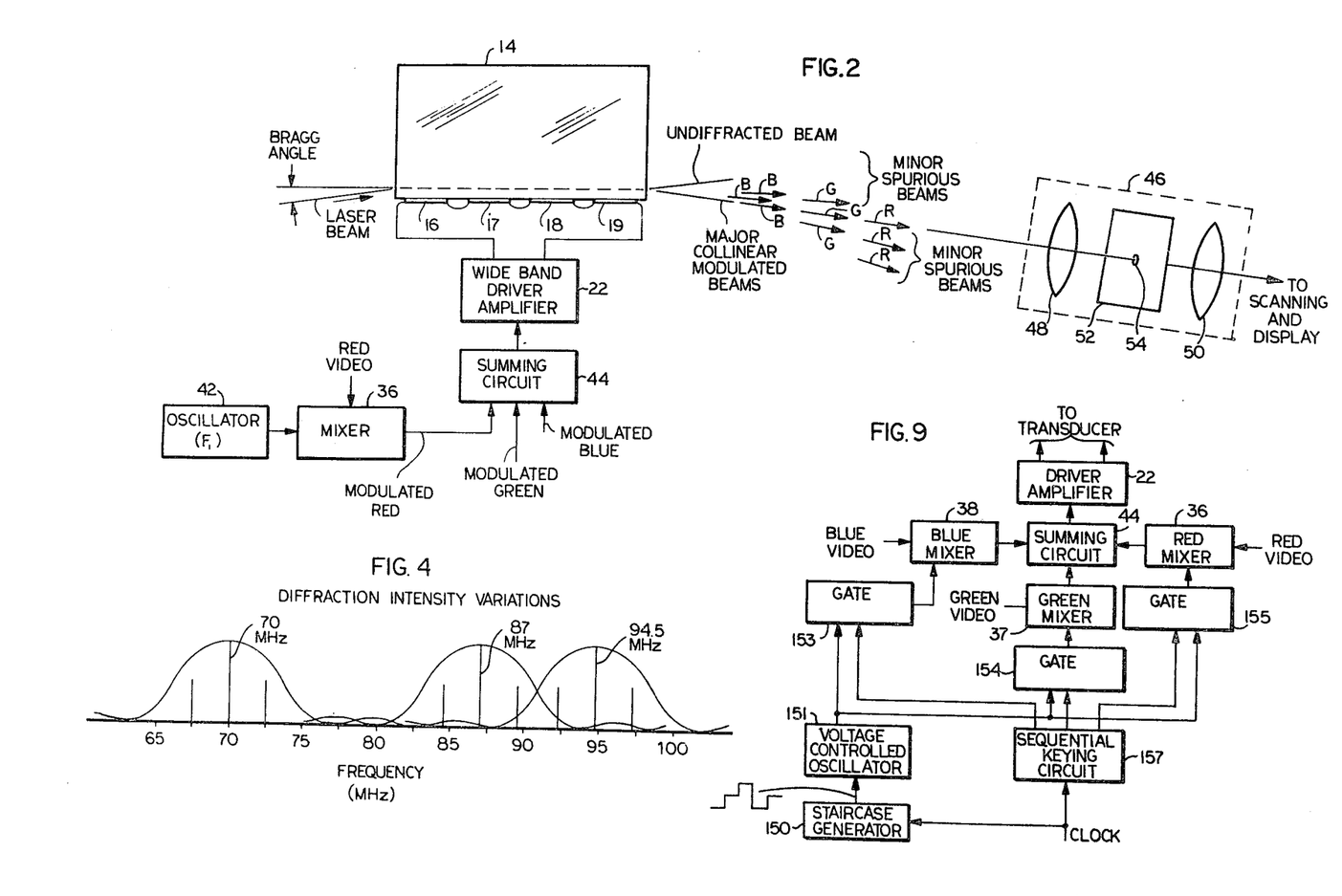
FIG. 2 is a combined plan view and block diagram representation of a portion of the system of FIG. 1, showing the modulator and beam relationships in further detail.
FIG. 4 is a graphical representation of modulated signal characteristics, illustrating the interrelationship between the sidebands and the acoustic carrier frequencies.
FIG. 9 is a block diagram of a multiplexing system that may be utilized in conjunction with the system of FIG. 1

Reference should be made to both FIGS. 1 and 2, the latter showing further details of the modulator device of FIG. 1. A single laser beam containing radiation of at least two different wavelengths is generated by a laser 10 energized by a power supply 12. In the specific example of a color television display system that is depicted, the laser 10 generates three selected primary color components, namely a red component at a wavelength of 6471 A°, a green component at 5208 A°, and a pair of blue components at 4762 and 4825 A°. A Spectra Physics model 165 ion laser employing Krypton is used for this purpose, it being recognized that many types of lasers are available for such applications. The given color combination has been found to provide generally more vibrant colors and more pleasing flesh tones than those obtained with most of the phosphor combinations now in use with conventional cathode ray tube television. Other spectral distributions involving different wavelengths or different numbers of wavelengths may, of course, be utilized in accordance with the invention. As another example, a Spectra Physics model 165 laser employing a krypton-argon mixture was used having wavelengths of 6471 A°, 5145 A° and 4880 A°, respectively.

The laser beam, which has an extremely small cross sectional area and is coherent at each of the excitation wavelengths, is directed so that it impinges on an acousto-optical modulating element 14 at a selected angle, as described below in greater detail. The beam path is directed along a given axis by appropriate orientation of the laser 10, or by separate means such as lenses or mirrors (not shown). In one specific example, the modulator used was a Model M-80X of predetermined specifications (given below) supplied by Zenith Radio Research Corp., Menlo Park, Calif., and having a center frequency of 80 MHz. This modulator 14 comprises an optically transparent high index glass serving as an acousto-optical medium although it will be appreciated that crystals or other media might also be employed. The total length of the element was six centimeters, and included four side mounted piezoelectric transducers 16, 17, 18, 19 coupled in series and having a total interaction length of five centimeters. In accordance with the following discussion, different center frequencies and different interaction lengths may advantageously be used within various permissible ranges.

The modulator element 14 has a variable periodic optical index of refraction, which is controllable by internally transmitted acoustic waves. The four transducers or modulator drivers 16, 17, 18, 19, are disposed along one side of the modulator element 14 and are coupled in series to a wideband driver amplifier 22. Excitation signals are derived from a television signal system 24, here depicted as a receiver although it may comprise a video tape system, a computer output, a television camera system, or any other source of video information. In the television signal system 24, signals derived at an antenna 26 are fed to conventional tuner 28, amplifier and detector stages 30 and synchronizing signal circuits 32 for generation of the video, horizontal synchronizing and vertical synchronizing signals respectively. The video signals are applied to a color decoder 34, which separates the red, green and blue components and applies these to individual mixers for generating amplitude modulated signals in response to carrier frequencies $f_1$, $f_2$, and $f_3$ respectively. An amplitude modulator for the frequency $f_1$ is more specifically shown in FIG. 2 and comprises the combination of the mixer 36 receiving the appropriate video component at one input and a carrier frequency, here designated $f_1$, from an oscillator 42 at another input. The outputs from all of the mixers 36, 37, 38 are combined in a summing circuit 44, which is coupled to the wideband driver amplifier 22 used to excite the transducers 16–19.

In the specific example of the invention being described, the frequencies are 70.0 MHz, 87.0 MHz and 94.5 MHz respectively. A video bandwidth of approximately 2.5 MHz was used for modulation, the sidebands thus being ±2.5 MHz relative to the carrier frequencies. For the laser employing a krypton-argon mixture, the frequencies were 71.0 MHz, 89.3 MHz and 94.1 MHz respectively, although it is preferred to use the pure krypton gas laser because of greater separation of the green and blue wavelength components, and because its particular chromaticity balance is preferable for some video displays.

As will be evident to those skilled in the art, and as depicted in FIG. 2, the acousto-optic interaction effect is utilized for intensity modulation of the color components of the incident laser beam. The optical index of refraction of particular acousto-optical materials varies in accordance with pressure upon the material. An optical beam will be diffracted at an angle, due to the presence of an acoustic pressure wave in such a variably refractive element, as follows:

$$\theta_o = \frac{\lambda f}{v} \qquad \text{(Equation 1)}$$

where $\theta_o$ is the angle of diffraction, f is the acoustic carrier frequency, $\lambda$ is the light wavelength and v is the velocity of sound in the acousto-optic material. The angle of diffraction is independent of the amplitude of the pressure wave, but the intensity of the diffracted beam is amplitude dependent. The carrier frequency is therefore the primary determining variable in establishing the diffracting angle for a given light beam. The impinging beam is disposed close to the side to which the pressure transducers 16–19 are coupled in order to achieve maximum interactive effect.

In accordance with the invention, each of the three acoustic carrier frequencies is selected with respect to a different one of the light wavelengths to derive a corresponding beam at the same predetermined angle $\theta_o$ for all wavelengths. From Equation 1, this relation is:

$$\lambda_1 f_1 = \lambda_2 f_2 = \ldots \lambda_n f_n \qquad \text{(Eq. 2)}$$

where $\lambda n$ = the wavelength of the nth component of diffracted light.

Referring specifically now to FIG. 2, observance of the acoustic frequency-light wavelength relationships of Equation (2) causes individual red, green and blue wavelength beams from the modulator 14 to be collinear along a principal axis, as indicated by small collinear arrows designated R, G and B. In addition, however, in accordance with Equation (1), the excitation pressure wave at each carrier frequency also modulates the two other wavelength beams, creating two additional resultant and undesired beams at different diffraction angles. These may be referred to as cross-modulation beams. The nine total beams in sets of three for this example are depicted in somewhat idealized form in FIG. 2 and the diffracted beams that are off the principal axis represent energy lost from the main beam. The variability of these losses constitutes crosstalk. Such losses can be tolerated in some applications, as where adequate laser output is available or beam output is not critical. In large screen video displays, however, it is generally not commercially feasible to use an extremely high power laser, and maximum display intensity is of great importance. Further, significant amounts of crosstalk can seldom be tolerated in color display systems.

The spurious beams may be angularly separated from the principal collinear beams by providing a sufficiently long optical path following the modulator element 14. Alternatively or additionally, filter means, such as the spatial filter 46 depicted in FIG. 1 and shown in greater detail in FIG. 2, may be utilized to eliminate the spurious beams from the system. Referring to FIG. 2 specifically, the filter 46 comprises two achromatic convex lenses 48, 50, aligned and spaced so that the distance between them is the sum of their focal lengths, with respect to light of the wavelengths of the principal beam. The spatial filter 46 also includes a mask 52 having a pin hole or slit aperture 54 at the common focal point of the two lenses 48, 50. Thus, the three collinear principal beams are transmitted through the mask aperture while spurious beams are deviated away from the principal beam and blocked by the mask 52.

Referring again to FIG. 1, the modulated beam passes from the spatial filter 46 through the beam scanning system for horizontal and vertical deflection, and on to a display 58 of the direct projection or rear projection type. In the beam scanning system, a high speed scanning mirror may be utilized for horizontal deflection, and a lower speed mirror or prism may be utilized for vertical deflection, as is known in the art.

As depicted by FIG. 3, the beams, and particularly the principal collinear beams have a finite divergence due to the diffraction divergence caused by the sidebands accompanying the carrier frequencies. The high frequency components in the video signal give rise to sideband beamlets diverging from the principal axis. There are also sideband beamlets for the spurious beams, but these are separated by the spatial filter 46. It is not desirable for most applications simply to spatially filter out or attenuate the spurious beams, because the energy would still be wasted. Thus use of the Debye-Sears region, in which diffraction efficiency is substantially constant at approximately 34%, inherently would mean that loss of substantial energy in the modulator. Workers in the art have nonetheless operated acousto-optical modulators either in the Debye-Sears region or in that part of the Bragg region in which diffraction efficiency does not change significantly with angle of diffraction. Under such conditions there is not only substantial energy loss in the collinear beams and in the spurious beams but significant degradation in display quality because of crosstalk between the collinear and spurious beams. For example, when the green component signal is of highest amplitude, the cross-modulation components due to the green signal are also at corresponding levels, and introduce maximum subtractive effect on the red and blue components. The variable nature of this crosstalk introduces generally unacceptable changes in color tonality.

In accordance with the invention, the acousto-optical modulator has a diffraction efficiency characteristic that varies with the angle of diffraction in integrated fashion relative to the video signal bandwidths. Specifically, the variation in diffraction efficiency with angle is placed well above both the Debye-Sears region and the commonly unused portion of the Bragg region in which variation of efficiency with angle is not pronounced. In effect, the angle sensitivity is tailored to the video signal bandwidths, and also takes into account a number of other factors, including optical wavelength separation and beam divergence.

From the prior discussion it is evident that the angle at which a given wavelength component is diffracted varies with both the acoustic modulating frequency and the optical wavelengths. It is shown hereafter than an angle sensitive regime can be established within the modulator for video signals, in which regime diffraction efficiency variations with the angle of diffraction provide both video signal bandpass filtering and spurious component suppression. The major, collinear beams are diffracted with high efficiency, while spurious beams resulting from cross-modulation components (e.g., the product of the red video signal and green optical wavelength) are not within the high efficiency diffraction band for any major beam. Thus, they neither subtract substantially from the major beams nor cause other mutual interference effects. Optical beams generated by sidebands of the main collinear beams are disposed within a given diffraction angle such as they are diffracted with substantial efficiency, and retain high resolution in the display.

Because optical wavelength is a component in the determination of diffraction angle, such system variables cannot be independently chosen when optical filtering effects are utilized in video display systems in accordance with the invention. It is nonetheless shown to be feasible to provide systems using single laser sources that concurrently have pleasing chromaticity and color tonality, high efficiency and freedom from crosstalk.

The acousto-optical modulator in systems according to the invention is advantageously operated in a video signal related, angle sensitive mode deeply enough within the Bragg region to get separation by first insuring that:

$$L >> \frac{v^2}{f^2 \lambda} \quad \text{(Equation 3)}$$

where L=interaction length

Where L is simply greater than the remainder of Equation (3) the modulator is operated in the Bragg region. Where L is substantially greater (of the order of 10) accompanying angle sensitivity has not been needed or been acceptable to most workers in the art. The angle sensitivity is attained in considerable part by use of a long interaction length and high acoustic carrier frequency for given conditions. In addition the modulator diffracts the chosen beams with very high efficiency, which can approach 100%. The optimum angles exist when the included angles between the incident and transmitted beams is:

$$\frac{\lambda_n f_n}{2v_n} = \theta_B \quad \text{(Equation 4)}$$

where $\theta_B$ is known as the Bragg angle.

Stated in another way, the diffracted angle is twice the Bragg angle. Thus, relative to the internal modulator beam path, and in a direction normal to the acoustic waves, the incident and collinear transmitted waves are symmetrical and each at the Bragg angle. It is demonstrable that in this angle sensitive mode the relative intensity (y) of the diffracted beam varies as:

$$y = \left( \frac{\sin \pi x}{\pi x} \right)^2 \quad \text{(Equation 5)}$$

where x is proportional to the angle of deviation of the operating angle from the Bragg angle, and more precisely:

$$X = \frac{L\lambda(f_o - f)}{2nv^2} \quad \text{(Equation 6)}$$

where $f_o$ is the correct acoustic frequency required to satisfy the Bragg condition for a given wavelength $\lambda$ and a particular angle of incidence. f is the actual acoustic frequency being used.

The $$\left( \frac{\sin \pi x}{\pi x} \right)^2$$

function, with intensity ordinate plotted against frequency abscissa, provides a rounded peak variation in intensity, with descending skirt portions oscillating in diminishing fashion along a baseline level in the manner of a normal diffraction pattern. The maximum value is unity, obtained at the proper selected carrier frequency, and under some circumstances other frequencies can be placed at zero diffraction points. The function is graphically illustrated in FIG. 4 with respect to the frequencies used in the present example.

While the Bragg angle is referred to as the angle between zero and first order diffracted beams, the conditions of Equations 4, 5 and 6 dictate beam symmetry relative to the acoustic waves for angle optimization. Because the input beams are collinear at a chosen angle that is equal to the angle of the collinear transmitted beams, the spurious beams are inherently off-angle.

An angle sensitive acousto-optical modulator functions effectively as a filter, transmitting at greatest intensity at the optimum angle, thus diffracting beams of lower strengths in accordance with the $$\left(\frac{\sin \pi x}{\pi x}\right)^2$$

function for other angles. The sensitivity with respect to angle of diffraction arises from phase interference effects similar to those arising when a light beam is directed toward a diffraction grating. Because the incident beams are collinear, but one set of exit beams can be made collinear, per Equation (1), then it may be seen that components of this collinear set are at maximum intensity when the following relationship is observed:

$$\frac{\lambda_1 f_1}{2v} = \frac{\lambda_2 f_2}{2v} = \frac{\lambda_3 f_3}{2v} \theta_B \qquad \text{(Equation 7)}$$

The $$\left(\frac{\sin \pi x}{\pi x}\right)^2$$

characteristic, however, can seldom provide a sharply defined passband, transmitting only the collinear beams with high intensity. Practical limits exist on the modulator interaction length, partly because of modulator design considerations, and partly because of the interdependence between modulator length, acoustic modulator frequencies, beam wavelength, and signal bandwidth. Higher carrier frequencies require shorter interaction length. As noted above, cross-modulation of different beams by unintended frequencies (e.g. the green beam by the blue modulating signal) is inherently present. In addition, sideband beamlets exist adjacent the collinear (as well as spurious) beams, because of the sideband components of the different color video signals.

Systems in accordance with the invention, however, reduce beam intensity losses and crosstalk to low levels by employing a number of frequency and bandwidth relationships to effect video bandpass filtering and spurious component suppression. The carrier frequencies are so interrelated to the other parameters and the $$\left(\frac{\sin \pi x}{\pi x}\right)^2$$

function that:

$$\frac{f_c^2 L \Delta \lambda}{2nv^2} = x \qquad \text{(Equation 8)}$$

where $f_c$ = the modulating carrier frequency for one of the acoustic frequencies and $\Delta\lambda$ represents the separation value between the closest adjacent optical wavelength pair. The term $f_c$ represents the lower of the two carrier frequencies for this worst case wavelength pair. Usually the most critical separation is between the blue and green components and the carrier frequency $f_c$ in Equation (8) will then refer to the green component. The value of x is of the order of unity and is selected for low spurious beam intensity. Assuming an acceptably low value (specifically 5%) of crosstalk, the value of x is at least 0.8. The value of x may be suitably adjusted for crosstalk levels, but for video systems a value of 0.6 (approximately 25% crosstalk) will generally be minimum acceptable value. The interaction length, frequencies and wavelengths may be modified, individually or together, to control the amount of crosstalk and separation. With the stated x value of 0.8 however, the cross modulation spurious beams, being incident at $\theta_B$, are diffracted with low efficiency (below 5%). Thus the spurious beams are substantially suppressed and consequently subtract little energy from the main, collinear, beams in a color video system. Observance of the relationships of Equation (8) with values of x of the order of unity inherently places the modulator in an angle sensitive portion of the Bragg regime.

The angle sensitive modulator employed as a video bandpass filter in accordance with the invention is also subject to two other interdependent considerations following from Equation (8). The incident beam has a finite transverse dimension which is kept small enough to have a suitably short transit time for the acoustic wave to pass across the beam in accordance with known considerations. Light beams, even laser beams, are not perfectly collimated, however, and diverge to an extent inversely related to their cross-sectional dimension. Waves divergent from the exact Bragg angle are diffracted with lower efficiency because of modulator angle sensitivity. Similarly, the optimum operating angle for a given carrier frequency is different from the optimum angles for the sidebands of that frequency. It is desireable, however, to preserve the sideband beamlets to retain the high frequency components and preserve display resolution.

In accordance with the invention, the video bandwidth is not permitted to exceed limits imposed by acceptable diffraction efficiency levels for a particular application. Given a predetermined modulator material with velocity v, refractive index n, and a critical wavelength separation $\Delta\lambda$ then the maximum bandwidth is:

$$B.W. = k_1 \left(\frac{v}{\lambda}\right) \sqrt{\frac{n \Delta \lambda}{XL}} \qquad \text{(Equation 9)}$$

where $\lambda$ is the wavelength of a particular color being modulated and $\Delta\lambda$ is the separation between it and the next shorter wavelength to be excluded and $k_1$ is a function determined by the acceptable diffraction efficiency. Assuming crosstalk of no more than 5%, (x=0.8), and using 75% as a satisfactory value for the maximum diffraction efficiency this is achieved by a $k_1$ value of 0.42. If acceptable diffraction efficiency can be reduced to approximately 70%, then constant $k_1$ has a value of about 0.52. Equation (9) demonstrates that the benefits of bandwidth potential obtained by reduction of beam diameter cannot be extended beyond the point at which diffraction efficiency falls below a selected level.

The video bandwidth is limited, for acceptable values of crosstalk and diffraction efficiency, by the narrowness of the $$\left(\frac{\sin\pi x}{\pi x}\right)^2$$

curve of Equation (5). A relationship comparable to Equation (9) is employed:

$$B.W. \geq k_2 \left(\frac{v}{\lambda}\right)\sqrt{\frac{n\Delta\lambda}{XL}} \quad \text{(Equation 10)}$$

In this instance, the bandwidth is limited such that the deviation of the sideband components from the optimum operating frequency causes less than a predetermined loss in sideband beamlet intensity. Good display resolution is attained by a $k_2$ value of 0.63, which places the sideband beamlets within the ½ power (3 DB) point on the skirts of the $$\left(\frac{\sin\pi x}{\pi x}\right)^2$$

curve. Because it is generally desired to retain sidebands with less than 3 DB loss, the selected value for x (and consequently the crosstalk level) will generally determine the maximum bandwidth limit imposed by Equation (10).

By employment of an angle sensitive modulator system in accordance with the above considerations, applicant has for the first time employed a single acousto-optical modulator with a multi-wavelength light beam to provide modulated collinear beams with high output efficiency and low crosstalk. Major collinear beams have been diffracted with 75% efficiency, the sideband beams being diffracted with more than 50% efficiency relative to the maximum (e.g. 37.5% where the maximum is 75%) and with crosstalk being below 5%. Consequently, applicant has, in practical examples of systems in accordance with the invention, provided large screen video displays having intensities not heretofore achieved for given light inputs, while preserving resolution and color tonality. For particular applications in accordance with the invention diffraction efficiency can approach 100% and crosstalk can approach zero.

Available modulator frequency characteristics determine in significant part the frequencies that can be employed for proper acoustic frequency-optical wavelength matching in accordance with Equation (1) and angle sensitivity in accordance with Equation (7). It can be seen from FIG. 4 that with the frequencies given as examples there is substantial overlap in the diffraction intensity curves for blue and green. With recently available high frequency modulators a greater frequency separation can be used. Thus in another practical example modulating carrier frequencies of 120.7 MHz (red), 150 MHz (green) and 163.3 MHz (blue) are employed with a modulator having an interaction length of 5 cm. This modulator design further reduces crosstalk between blue and green as well as the less critical pairs. Acousto-optical modulators having center frequencies of up to 250 MHz and more are now becoming available, which would permit shorter lengths to be employed, although certain difficulties are encountered in working at such frequencies. Higher carrier frequencies increase the sensitivity to angle of diffraction, thereby reducing crosstalk as well as increasing the separation angle between the principal and minor beams.

Figures 5, 6:
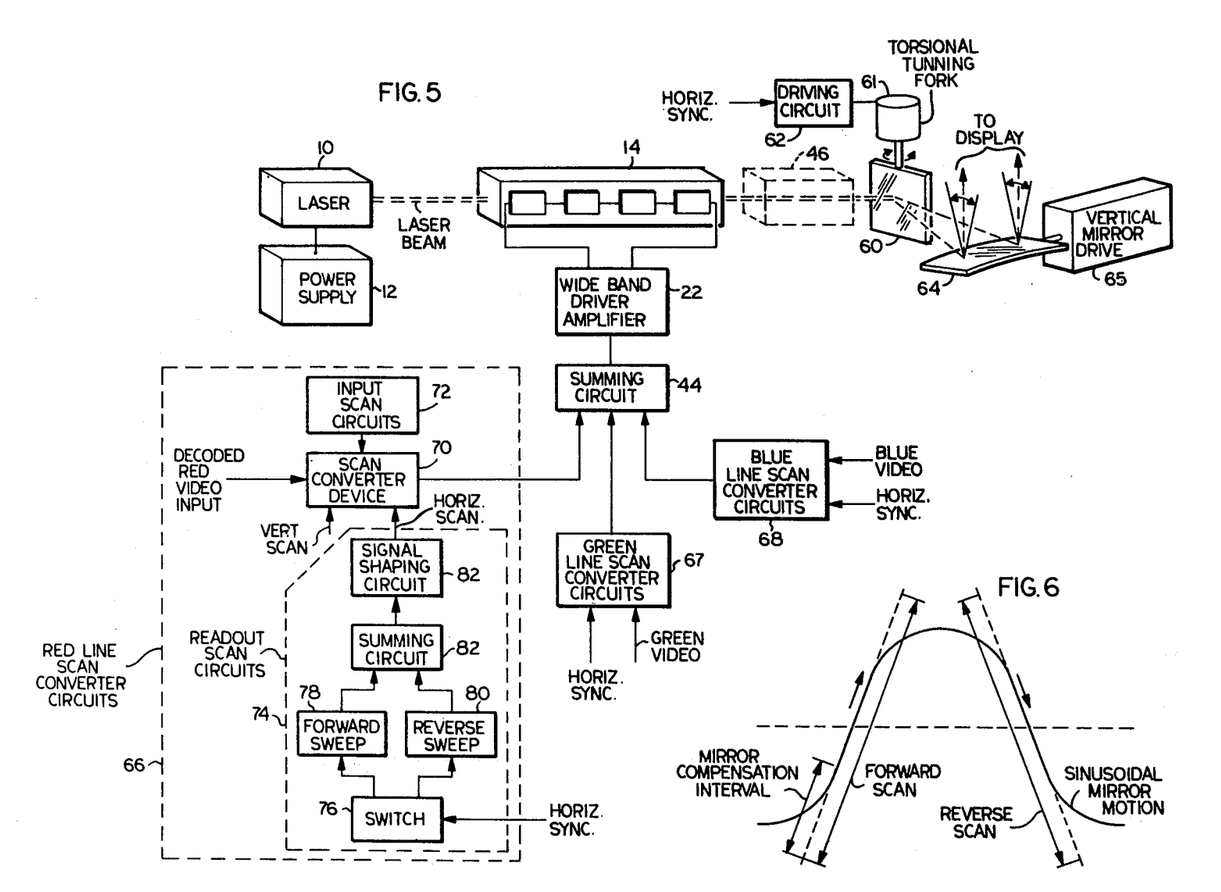
FIG. 5 is a combined perspective and block diagram representation of a system in accordance with the invention utilizing line scan reversal.
FIG. 6 is a graphical representation of the scanning motion of the scanning mirror in FIG. 5 illustrating the usage of linear portions of the motion.

The use of a collinear multi-wavelength beam to generate a display with a standard television signal presents particular problems in horizontal scan, because of the horizontal scan repetition rate of 15,734 lines per second. Usage of an acousto-optical modulator for scanning is theoretically possible, but subject to the problems and losses arising from differential diffraction of the various wavelengths and the generation of spurious beams mentioned above. High speed scanning mechanisms such as low inertia mirror systems driven by galvanometer mechanisms and rotating multifaceted reflectors present different problems, the former because known mechanisms cannot return to the scan start position with adequate speed to scan every horizontal line, and the latter because of costs arising from the optical and servo precision needed to get adequate performance and reliability independent of wear and usage. In the example of FIG. 5, a simple and reliable scanning mechanism comprising a mirror 60 driven in a sinusoidal motion by a torsional tuning fork 61 is arranged in a manner such that horizontal scanning of each line is effected without material loss of light energy. The torsional tuning fork 61 is a known device which rotates with a given arc of movement at a selected resonant frequency under the control of a driving circuit 63 which is itself activated by the horizontal synchronizing signal. Other known electromechanical elements may alternatively be used. The sinusoidal motion of the mirror 60, as depicted in FIG. 6, has substantially linear slope regions, as is well known, but the relatively slow motion reversal and return movement dictate that this combination can be used straightforwardly only in scanning every other line. Nonetheless, the display resolution and intensity are still adequate for many purposes, even video displays, under these conditions. With most video displays, however, loss of a significant portion of the display means not only a reduction in display resolution and intensity but a correspondingly reduced efficiency in usage of the laser light source.

The system of FIG. 5, however, is arranged in combination with the scanning mechanism such that substantially complete display of each horizontal scan line is effected, without disturbing nonlinearities or reduction of light output efficiency. The non-linear horizontal sweep introduced by the horizontal scanning mirror 60 is first compensated and converted to a substantially linearly varying sweep by a curved convex vertical scan mirror 64. The vertical mirror 64 functions as a cylindrical aspheric optical element, diverging the horizontal scn angle in controlled fashion at terminal portions of each sweep. This effect is provided by a non-uniform convex curvature surface intercepting the horizontal scan plane. Within the central region of the horizontal scan arc corresponding to the substantially linear portion of the sinusoid, the vertical mirror 64 is substantially flat, but in each outward direction therefrom it assumes increasing curvature. Consequently, in the portions of movement of the horizontal scan mirror 60 in which that mirror is changing direction, the compensation effect substantially linearizes the horizontal scan motion. The substantially linear portion of the sinusoidal motion is thus extended at each end. Separate line scan converter circuits 66, 67, 68 for red, green and blue respectively receive decoded video inputs and provide alternating forward and inverted scan of successive lines. Inasmuch as the circuits 66-68 may be identical, only the red video signal line scan converter circuits will be described in detail.

In the line scan converter circuits for the red signal, a conventional scan converter device 70, of the type widely employed for converting from one television standard to another, receives decoded red video input signals and stores these, line by line under control of input scan circuits 72. Horizontal synchronizing pulses are applied to a switch 76 in the readout scan circuits 74 which applies alternate pulses to forward sweep and reverse sweep circuits 78, 80, respectively. The sweep circuits 78, 80 are triangular waveform generators providing oppositely sloped ramp signals that are combined in a summing circuit 82 and may be applied to a signal shaping circuit 84 before being coupled as horizontal scan signals to the scan conversion device 70. The signal shaping circuit 84 may comprise a passive network which changes the linear slope of the ramp to precompensate for minor non-linearities in the scanning motion.

In the operation of the system of FIG. 5, therefore, the single multi-wavelength laser beam is directed through a single modulator 14 and a spatial filter 46, as previously described. Under control of the horizontal synchronizing signal the torsional tuning fork 61, which is resonant at ½ the frequency of the horizontal synchronizing signal, vibrates the horizontal scanning mirror 60 in a sinusoidal motion to provide a horizontal scan arc, while the vertical mirror drive 65 operates the vertical scanning mirror 64 to provide the desired two dimensional scan raster. The curvature at the terminal portions of the convex vertical mirror 64 corrects for velocity variations in the sinusoidal motion of the horizontal scan mirror 60. Concurrently, the red, green and blue line scan converter circuits 66, 67 and 68 respectively, invert each alternate horizontal line of video input by inverting the horizontal scan signals that control the typical scan converter device 70. Thus, as shown in FIG. 6, movement of the horizontal scan mirror 60 in one direction is used for forward scan and the return movement is used for the reverse scan. Because all three color components are similarly processed, a simple and reliable scanning mechanism can be used to provide a large screen color display without loss of intensity or resolution. Electronic compensation for minor non-linearities may be used, as indicated but typically need not be employed.

It will be evident to those skilled in the art that many other scan converter arrangements could be employed. Signal shaping, for example, need not be employed, or may be effected by optical means. Alternatively, the sweep circuits themselves may be arranged to generate slightly non-linear ramps, and other combinations, such as inverter circuits, may be used to provide forward and reverse sweeps with a single ramp generator. In addition, the scan converter function may be supplied by a digital TV type of system including a semiconductor or other digital memory for storing successive lines, and reading these out in alternating forward and reverse scans, with appropriate adjustment of scanning rates and blanking intervals. In addition, it will be recognized that the horizontal line scan signal may be provided by employing a position transducer (not shown) coupled to sense the instantaneous position of the scanning mirror 60.

Figure 7:
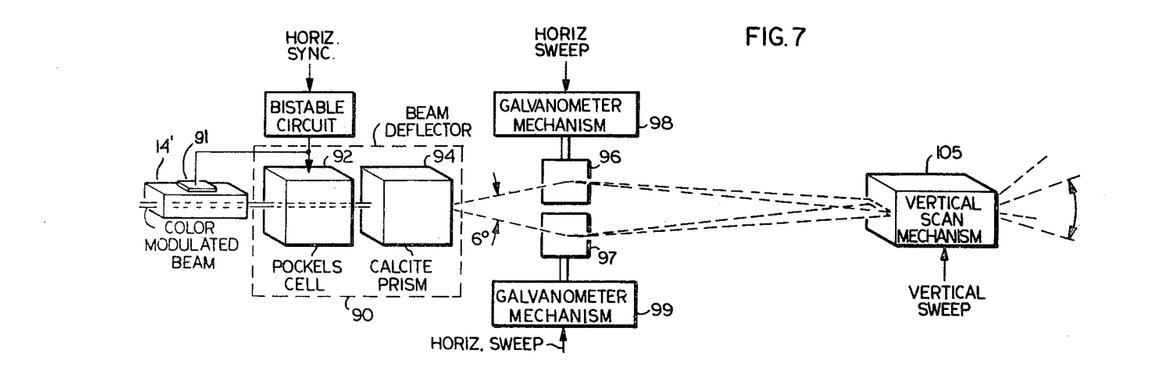
FIG. 7 is a combined block diagram and simplified perspective representation of a beam alternator system in accordance with the invention.

A different arrangement in accordance with the invention for scanning successive horizontal lines with a single collinear multi-chrominant beam may utilize a two-position beam deflector switch such as is shown in FIG. 7. In FIG. 7 the beam deflector switch 90 comprises a combination of a Pockels cell 92 and a calcite prism 94 disposed in series along the beam path subsequent to the modulator 14'. As is well known, the Pockels cell 92 and calcite prism 94 combination forms a digital polarization beam deflector. In response to an electrical signal, the Pockels cell 92 causes a 90° rotation of an incident polarized wave, and the calcite prism 94 deflects the incident wave approximately 6°. Any of a number of polarization rotators and polarizing prisms may be used and different angles between the ordinary and extraordinary rays may also be used. With the Pockels cell 92 energized during alternate horizontal line scans by a bistable circuit 96 responsive to the horizontal synchronizing pulses, the beam from the beam deflector switch 90 shifts successive line scans between upper and lower mirror 96, 97 respectively, each separately driven by a different vibrating mirror mechanism 98, 99 under control of the horizontal sweep signals. The mirrors 96, 97 are in synchronism with the line repetition rate, cycling at one-half the line rate, as does the beam switching system. The scanning beams are directed back to near coincidence by slight tilting of the axes of the mirrors 96, 97, such that the beams after scanning by the vertical scanning mechanism 105 are displayed in proper display position on the screen. Thereafter, the horizontal scan lines are directed by the vertical scan mechanism 105 into the two-axis television display.

With the beam deflector switch 90 directing the multi-chrominant beam alternatively against the opposed-phase deflecting mirrors 96, 97, each horizontal scan line is displayed so that full resolution and beam intensity are maintained. The vibrating mirror mechanisms 98, 99 thus have a full horizontal line plus blanking interval to return to the start of the scan position.

Alternatively, the two-state beam deflection may be effected by other electronic or electromechanical techniques. For example, the beam deflector may comprise an acousto-optical modulator of the type previously described in conjunction with FIGS. 1-4, but with an additional transducer 91 positioned on the modulator element 14' in a direction to generate pressure waves orthogonal to the angle of diffraction of the collinear beams. The orthogonal energizing signal can vary in square wave fashion but again, the modulation frequencies must be selected not only to provide the proper diffraction angle but also maintain collinearity for the different wavelength components. The acousto-optical modulator for controlling beam deflection may be either the primary modulator 14 or a second modulator appropriately disposed along the beam path. Both the modulator 14' and the Pockels cell-calcite prism combination may be used simultaneously to obtain greater beam switching angles if needed.

Inasmuch as the collinear beam need only be displaced through a relatively small angle, the use of an electromechanical element of sufficiently high frequency characteristics is feasible. The reflective element also provides achromatic operation at high efficiency. Taking advantage of these factors, the two-state beam deflector may comprise a piezoelectric device coupled to or having a mirror surface and undergoing an adequate amount of mechanical deformation in response to applied energizing signals. Thus a laser beam incident on the mirror surface may be displayed by a given angle for each alternate horizontal line as the piezoelectric element is energized in square wave fashion.

Figure 8:
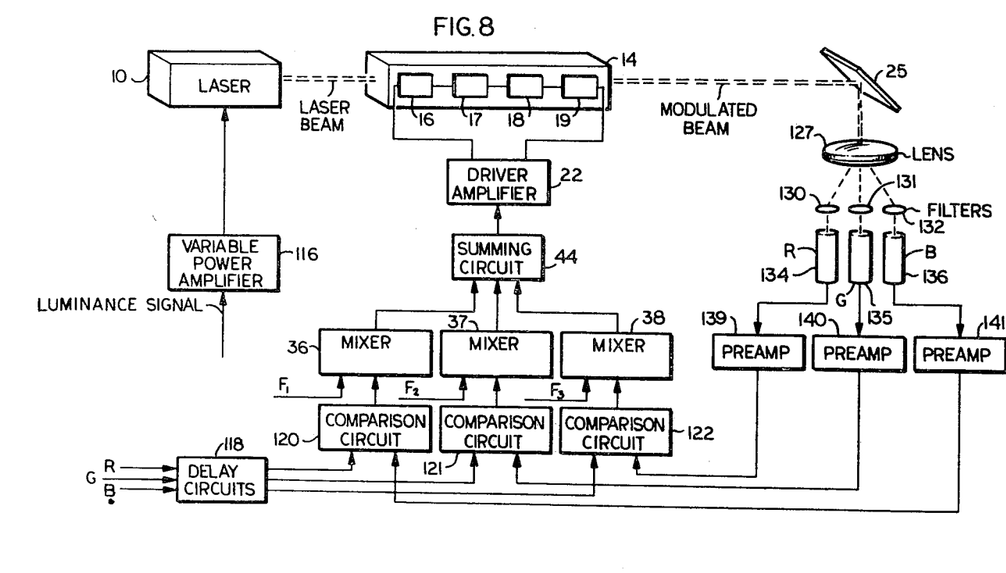
FIG. 8 is a block diagram representation of a system in accordance with the invention for modulating laser power concurrently with modulation of beam intensity by an acousto-optical element.

The system of FIG. 8 depicts an aspect of modulation techniques in accordance with the invention for achieving high output efficiency in relation to the power input to a laser 10. In this example, the multi-chrominant laser beam is modulated in a single modulator by color signals applied to transducers 16–19 from a summing circuit 44 via driver amplifier circuits 22 as previously described. However, the laser 10 is not fully energized at all times. Instead the laser power is varied in accordance with the average power required, consistent with the response characteristics of the laser. To this end, the color luminance signal is applied as a control signal to a variable power amplifier 116 driving the laser 10.

Because of the finite response time of the laser 10 subsequent to changes in the excitation signal, delay circuits 118 are employed in circuit paths coupling the demodulated video signals to the modulator driver system. The delayed video signals provide reference signals at comparison circuits 120, 121 and 122, which may be conventional operational amplifiers used in a differential amplifier mode. Actual beam intensity in each of the three colors is sensed by sampling the output beam from the modulator 14 by deflecting a small proportion off an angled beam splitter 125 in the light path (such as an optical element having a slight angular deviation from the Brewster angle). The deflected sample is expanded into a convergent beam by a lens 127 to pass through each of a set of three different color filters 130, 131, 132 for red, green and blue respectively, in correspondence to the incident wavelengths of the laser 10. The instantaneous amplitude of each color component is sensed by a different photosensitive cell 134, 135 or 136 respectively, and the resultant signals, after amplification in different pre-amplifiers 139, 140, 141, respectively, are applied as beam sample signals to the appropriate comparison circuits 120, 121, 122 respectively. Thus, each comparison circuit compares the desired beam intensity for a given color to the actual beam intensity, and generates a correction signal that is applied to the appropriate modulator 36, 37 or 38 to servo beam intensity for the color to the desired level. The signals are then combined in the summing circuit 44 and the transducers 16–19 are driven as previously described.

In this system, therefore, variations in average power required are accomplished by modulating laser 10 power input at the variable power amplifier 116. Because of the relatively low efficiency of the laser in generating light, substantial savings are effected by not running the laser at peak power except as needed. High frequency variations in each color component are introduced by the modulator 14, which effectively subtracts light energy in the amount needed for each component.

As previously indicated, crosstalk can be an important consideration in a multi-wavelength system using a single modulator. Where it suffices to provide collinear output beams without maximizing display intensity, the multiplexing arrangement of FIG. 9 may be utilized. In this system, units performing substantially the same functions as in the system of FIG. 1 are similarly numbered and designated. The system functions in a fashion comparable to a dot sequential type of television system. A staircase signal generator 150 generates three successive voltage levels in repetitive fashion under control of a clock signal which is at an appropriately high sampling rate relative to the video signals. The staircase signal controls a voltage controlled oscillator 151 to provide a repetitive sequence of carrier frequencies $f_1$, $f_2$, and $f_3$. Each carrier frequency is gated to be applied to the proper mixer 36, 37, 38 by a gate circuit 153, 154, 155, under control of a sequential keying circuit 157 also responsive to the clock.

In the system of FIG. 9, however, it is evident that only the energized mixer 36, 37 or 38 at a particular time causes the corresponding optical wavelength to be diffracted along the main optical axis. The unwanted spurious beams are diffracted at other angles and spatially filtered or otherwise optically separated from the system. The energy contained in the unused beams at any instant, roughly $\frac{2}{3}$ of the incident energy, is not utilized but such losses are acceptable in many graphical arts, communications and other systems.

While there have been described above and shown in the drawings various systems and methods in accordance with the invention, it will be appreciated that the invention is not limited thereto but encompasses all variations and modifications within the scope of the appended claims.

I claim:
1. A system for line scanning at a high repetition rate, and with linear motion, a light beam modulated with data signals provided in successive line form comprising:
light intensity modulator means disposed in the path of the light beam;
an electromechanical scanning mechanism disposed in the light beam path subsequent to said modulator means, said scanning mechanism operating with a cyclic forward and reverse motion to deflect the light beam in a line scanning fashion;
and modulator energizing means coupled to said modulator means, said energizing means including line converter means responsive to the data signals for alternately reversing the time sequences of alternate data signal lines read out to said modulator means.
2. The invention as set forth in claim 1 above, wherein said scanning mechanism operates with a sinusoidal motion, and wherein said converter means includes means to read out data lines during the substantially linear portions of the scanning mechanism motion.
3. The invention as set forth in claim 2 above, wherein said converter means further includes means for compensating in the data readout rate for non-linearities in the motion of the scanning mechanism.
4. The invention as set forth in claim 2, wherein the scanning mechanism includes optical means for extending the duration of the substantially linear portions of the scanning motion.
5. A system for horizontal line scanning of a multi-chrominant laser beam modulated with a color television signal and comprising:
light intensity modulator means disposed in the path of the laser beam;
an electromechanical beam deflecting mechanism disposed in the light beam path subsequent to said modulator means, said scanning mechanism operating in a forward and reverse motion synchronous with the horizontal scan rate;

and means responsive to the color television signal and coupled to energize said modulator means, said means including means for reversing the time sequence of alternate horizontal lines of the television signal, such that both forward and reverse motions of the deflecting mechanism are used in generating a display.

6. A system for scanning a modulated light beam through different scan directions to provide a scanning raster comprising:

first scanning mirror means disposed in the light beam path and having a sinusoidal scanning motion to deflect the light beam repetitively through an arc in a first plane, and second scanning mirror means disposed in the path of the light beam deflected from the first scanning mirror means and deflecting the light beam through an arc at an angle relative to the first plane, said second mirror means includes a convex mirror surface curved to linearize at least a portion of the scanning motion in the first plane.

7. The invention as set forth in claim 6 above, wherein the first scanning mirror means comprises a horizontal scan mirror and a coupled sinusoidal drive mechanism operating at one-half the frequency of a selected horizontal scanning rate, and wherein the convex mirror surface comprises a vertical scan mirror having a substantially linear central reflecting portion and terminal portions of increasing curvature defining a cylindrical aspheric optical means relative to the horizontal scan.

* * * * *